(12) United States Patent
Ballas et al.

(10) Patent No.: US 6,819,967 B2
(45) Date of Patent: Nov. 16, 2004

(54) RELATIONAL DATABASE FOR PRODUCING BILL-OF-MATERIALS FROM PLANNING INFORMATION

(75) Inventors: Donald F. Ballas, Colchester, VT (US); Jeanne P. S. Bickford, Essex Junction, VT (US); Thomas R. Maheux, South Hero, VT (US); Paul G. McLaughlin, Essex Junction, VT (US); Donald L. Poulin, Montgomery Center, VT (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 10/064,531

(22) Filed: Jul. 24, 2002

(65) Prior Publication Data

US 2004/0019604 A1 Jan. 29, 2004

(51) Int. Cl.[7] .............................................. G06F 19/00
(52) U.S. Cl. ........................ 700/107; 700/99; 700/104; 700/106; 700/97
(58) Field of Search ........................... 700/97, 99, 104, 700/106, 107

(56) References Cited

U.S. PATENT DOCUMENTS

| | | | |
|---|---|---|---|
| 4,827,423 A | * | 5/1989 | Beasley et al. ................ 700/96 |
| 4,847,761 A | * | 7/1989 | Ferriter et al. ................ 705/29 |
| 4,862,376 A | | 8/1989 | Ferriter et al. |
| 4,931,929 A | | 6/1990 | Sherman |
| 4,992,940 A | | 2/1991 | Dworkin |
| 5,210,686 A | | 5/1993 | Jernigan |
| 5,295,067 A | | 3/1994 | Cho et al. |
| 5,317,729 A | | 5/1994 | Mukherjee et al. |
| 5,359,508 A | * | 10/1994 | Rossides ...................... 705/30 |
| 5,550,746 A | | 8/1996 | Jacobs |
| 5,675,784 A | | 10/1997 | Maxwell et al. |
| 5,726,898 A | | 3/1998 | Jacobs |
| 5,765,137 A | | 6/1998 | Lee |
| 5,768,142 A | | 6/1998 | Jacobs |
| 5,797,128 A | | 8/1998 | Birnbaum |
| 5,855,013 A | | 12/1998 | Fisk |
| 5,864,875 A | * | 1/1999 | Van Huben et al. ........ 707/200 |
| 5,987,468 A | | 11/1999 | Singh et al. |
| 5,991,728 A | | 11/1999 | DeBusk et al. |
| 6,072,949 A | | 6/2000 | Futatsugi et al. |
| 6,208,987 B1 | | 3/2001 | Nihei |
| 6,295,531 B1 | | 9/2001 | Bae et al. |

FOREIGN PATENT DOCUMENTS

EP        0 982 675        3/2000

OTHER PUBLICATIONS

Product Overlay Control and Analysis Package For Wafer Manufacturing, IBM Technical Disclosure Bulletin, vol. 30, No. 2, Jul. 1987, pp. 683–685.

Execute Multiple Knowledge–Based System Products in anMSV Subsystem, IBM Technical Disclosure Bulletin, vol. 38, No. 2, Feb. 1995, pp. 309–310.

* cited by examiner

Primary Examiner—Albert W. Paladini
Assistant Examiner—Michael D. Masinick
(74) Attorney, Agent, or Firm—McGinn & Gibb, PLLC; Richard M. Kotulak, Esq.

(57) ABSTRACT

A system and method for reserving manufacturing capacity to satisfy a customer deliverable order for a product. The system and method uses a relational database tool adapted to receive said customer deliverable order; and a product manager tool operatively connected to said relational database tool, said product manager tool being adapted to obtain a block of part numbers from unallocated part numbers and to supply said block of part number to said relation database.

17 Claims, 7 Drawing Sheets

RELATIONAL DATABASE FOR PRODUCING BILL-OF-MATERIALS FROM PLANNING INFORMATION

BACKGROUND OF THE INVENTION

1. Field of the Invention

The present invention generally relates to systems for planning and more particularly to a system that includes a relational database that produces bill-of-materials from planning information.

2. Description of the Related Art

High tech products require the development of complicated bill-of-material (BOM) structures to support manufacturing stocking and build options. High tech industries typically use a product manager tool in a manual process to create and release BOMs and put some pieces of information in multiple parts of the BOM structures. This manual process is very error prone and provides many situations where the information is not updated in all locations, which may cause products to be built incorrectly. Further, the current process is very labor intensive and product sometimes need to wait until the BOM structures are reviewed before manufacturing begins. Separate software tools are often used to perform part of ordering, such as mask ordering.

In the semiconductor industry mask ordering and the preparation of the graphical data used to make masks are separate and usually manual or semi-automated activities. Newer technologies require much more extensive graphical data preparation. If the data preparation and mask build are not completely integrated, defective products will be produced. Currently, in the semiconductor industry, large amounts of resource are invested in checking and rechecking data prep and mask orders to ensure they match.

In addition, businesses typically run financial plans in different systems than those used to support tactical execution in systems, such as the systems used to create BOMs. For high technology parts, this results in differences in execution that could be related to changes in product description, changes in volume demand, or changes in manufacturing. When implementing complex high part number products, it is almost impossible to separate out the cause of the problem. Accountability of the business management team is difficult to establish because the productivity of the teams cannot easily be measured. Therefore, there is a need for a system that can automatically identify the bill-of-materials from a customer's description (e.g., from the customer's perspective).

BRIEF SUMMARY OF THE INVENTION

In view of the foregoing and other problems, disadvantages, and drawbacks of the conventional systems the present invention has been devised, and is an object of the present invention to provide a system that includes a relational database that produces bill-of-materials from planning information.

In order to attain the object(s) suggested above, there is provided, according to one aspect of the invention a method of forecasting financial obligations for all aspects of manufacturing semiconductor chips including mask manufacturing. The invention prepares a relational database of part numbers that describes all information that allows the planning and build of all manufacturing subassemblies needed to produce an end semiconductor (or any product) and provides interlock with design protocols to automatically define the development and manufacturing processes needed to create this product. Individual processes performed include processing a mask order through the relational database to output part numbers, predicting the cost of the mask, predicting the cost of the product, and altering the sourcing of the product with changes to the mask design. The overall system provides the capability to plan capacity for manufacturing sub-components before the components are developed, early ordering for sub-components that exist, interlock of manufacturing and development processes, and a seamless process where the description of the undeveloped product can be altered and the impact on the released and unreleased sub-components can be seen instantly. When a decision is made to proceed to manufacturing, the data in the conceptual bill-of-material can be frozen and moved automatically to the system used to store records used by manufacturing and to the customer and manufacturing ordering systems.

More specifically, the invention provides a system for processing orders for products. The system includes a relational database that stores part numbers, a manufacturing planning engine operatively connected to the relational database, and a customer engagement tool operatively connected to the relational database. The part numbers correspond to parts used to manufacture the products. The part numbers are associated, in the relational database, with information needed to manufacture the parts. The relational database is adapted to automatically produce at least one bill-of-material for at least one part based on a customer description of a product. The manufacturing planning engine is adapted to initiate at least one manufacturing order using the bill-of-material. The customer engagement tool is adapted to provide information regarding price and delivery dates of the product based on the information within the relational database.

The information needed to manufacture the part includes the subassemblies needed to manufacture the part, cost of manufacturing the part, sources of the part, time necessary to manufacture the part, and/or availability of the part. The invention also includes a demand forecast tool operatively connected to the relational database. The demand forecast tool is adapted to automatically revise the manufacturing order based on changes in demand for the product.

The manufacturing planning engine is further adapted to place the manufacturing order even before a design of the product is completed. The manufacturing planning engine is further adapted to reserve manufacturing capacity for the part based on the information within the relational database. The bill-of-material includes tools needed to manufacture the part, detailed measurements of the part, and/or structures needed in the part.

Thus, the relational database tool receives the customer deliverable order, the product manager tool obtains a block of part numbers from unallocated part numbers and supplies the block of part number to the relation database, and the relational database tool automatically prepares a bill-of-materials to satisfy the customer deliverable order using part numbers from the block of part numbers. The product manager tool changes manufacturing capacity by obtaining of the block of part numbers and a customer engagement tool forecasts the cost of, and delivery date for the product based on the bill-of-materials and the manufacturing capacity. The manufacturing planning engine allocates capacity for the product based on the bill-of-material and the relational database revises the bill-of-materials as the designing of the product progresses. A manufacture driving tool begin manufacturing of sub-components for the product even before the design of the product is completed. The invention also includes an add/obsolete tool that automatically deletes unneeded part numbers from the relational database tool.

The invention also includes a data preparation engine operatively connected to the relational database. The data preparation engine is adapted to automatically prepare graphical data needed to manufacture the product based on the information within the relational database. Thus, the invention automatically produces bill-of-materials for a semiconductor mask to satisfy a customer deliverable order. The relational database tool receives the customer deliverable order, the product manager tool obtains a block of mask part numbers from unallocated mask part numbers to satisfy the customer deliverable order, and the data preparation tool automatically provides prepared graphical data for the mask to the relational database tool. The relational database tool automatically prepares the bill-of-materials to satisfy the customer deliverable order using the prepared graphical data and part numbers from the block of part numbers. The prepared graphical data includes the type and location of pellicle, size of the mask, thickness of the mask, compensation needed in the mask to accommodate wafer and mask manufacturing needs, structures needed to use the mask to make the product, structures needed to control manufacturing of the product, etc. The relational database tool identifies data preparation protocols to permit the data preparation tool to produce the prepared graphical data. Each sub-component of the mask has an associated data preparation protocol. The relational database identifies the data preparation protocols automatically based on the customer order deliverable. The product manager tool obtaining the block of part numbers changes the mask manufacturing capacity and the customer engagement tool forecasts a cost of, and delivery date for the mask based on the bill-of-materials and the mask manufacturing capacity.

In addition, the invention also provides a method for processing orders for products. The method includes the steps of preparing a relational database of part numbers, automatically producing at least one bill-of-material to manufacture at least one part based on a customer description of a product using the relational database, and providing information regarding price and delivery dates of the product based on the information within the relational database. The part numbers correspond to parts used to manufacture the products and the part numbers are associated, in the relational database, with information needed to manufacture the parts.

The process of preparing the relational database includes providing the subassemblies needed to manufacture the part, cost of manufacturing the part, sources of the part, time necessary to manufacture the part, and/or availability of the part, as the information needed to manufacture the part. The method also automatically places a manufacturing order for the part based on the information within the relational database and automatically revises the manufacturing order based on changes in demand for the product. The invention additionally can place the manufacturing order even before a design of the product is completed. The invention can reserve manufacturing capacity for the part based on the information within the relational database.

The producing of the bill-of-material includes identifying the tools needed to manufacture the part, detailed measurements of the part, and structures needed in the part, based on the information within the relational database. The invention can also automatically prepare graphical data needed to manufacture the part based on the information within the relational database.

BRIEF DESCRIPTION OF THE SEVERAL VIEWS OF THE DRAWINGS

The foregoing and other objects, aspects and advantages will be better understood from the following detailed description of a preferred embodiment(s) of the invention with reference to the drawings, in which.

DETAILED DESCRIPTION OF THE INVENTION

As mentioned above, there is a need for a system that can automatically identify the bill-of-materials from a customer's description (e.g., from the customer's perspective). This invention uses a relational database to describe the part from the customer's perspective and derives the bill-of-material (BOM) that is needed to specify the part to the various manufacturing lines that will participate in the build of it and its sub-components. The invention allows integration of all BOM activities into one place and eliminates secondary systems (such as mask ordering). Further, since all BOM data is derived from a common data set, the error rate from data mismatches becomes zero. The present invention includes a method that defines high tech products at plan time, passes the information to the tactical manufacturing planning engine to set the base of the plan, provides a means to update the tactical plan as product definition or manufacturing loading and sourcing change, and tracks changes and updates the manufacturing resources within a relational database as needed.

Businesses typically run financial plans in different systems than those used to support tactical execution in manufacturing systems for high technology parts. This results in differences in execution that could be related to changes in product description, volume demand, or manufacturing implementation for complex high part number products. It is almost impossible to separate the cause of the problem; and accountability of the business management team is difficult to establish because they cannot easily be measured.

This invention uses a relational database to describe the part from the customer's perspective and derives the bill-of-material (BOM) that is needed to specify the part to the various manufacturing lines that will participate in its build. The invention allows integration of all BOM activities into one place, eliminates secondary systems (i.e., mask ordering) and, since all BOM data is derived from a common data set, the error rate from the data mismatches becomes zero.

The present invention provides a method to define high tech products at plan time and passes the information to the tactical manufacturing system. The planning engine sets the base of the plan, and provides a means within a relational database to track the changes and updates the manufacturing resources as needed.

The invention provides a relational database tool that has reset points, and customizable communication means. The invention provides answers to critical product questions. The invention uses the answers to define a product part number and structure. The invention then derives the product description information needed by the manufacturing system from one source. The invention populates the product description information in appropriate fields and provides reset points to accommodate the changes in a controlled fashion.

In one embodiment, the invention is used to drive the BOM's for wafers, die, packages, and completed semiconductor products. In a second embodiment, the invention is used to automatically order masks for semiconductor products based upon product descriptions. All semiconductor suppliers use masks in the process to create semiconductors. The ordering of masks in most suppliers is a manual process that uses paper order forms or flat files that are filled out each time a mask is needed. This is very labor intensive and very prone to error which can often result in only part of the information desired by the manufacturing lines being included in the mask BOM.

The invention uses a relational database which asks the requester basic questions and derives technology and tool related elements to populate mask bill-of-material (BOMs) which provides information through the BOM to the line building the wafers that use the masks. This eliminates redundant parts of mask ordering. This method of ordering drastically reduces the resources needed to order masks and eliminates many sources of error. The invention uses the relational database to simplify the questions asked to the business community base. The data questions must be answered because the relational database provides the means to populate product descriptions for initial planning and planning/product updates. The invention establishes on the fly, the needed manufacturing substock elements that are required to enable planning. The substock elements are established based on simple questions in the input stream. (The invention determines if this is a wafer, module, chip, etc.). The invention has the ability to track changes made by the manufacturing system (table control) or business planning group (product description). The invention integrates the planning into the tactical execution engine (only one set of volumes need to be maintained). The invention also has the ability to bridge planning to execution from a financial standpoint with the long range capability to set up a financial system that allocates the cost of goods used and plan time and measures performance to those requirements.

The invention has a questionnaire that links to a technology table that has the ability to handle multiple manufacturing tool build options and lines. The invention uses a manual override process (as required) that uses a combination of technology/line and tool tables to simplify table maintenance and avoid redundant data storage. The mask BOM contains all information needed to easily use the mask to build semiconductor products.

Figure 1:
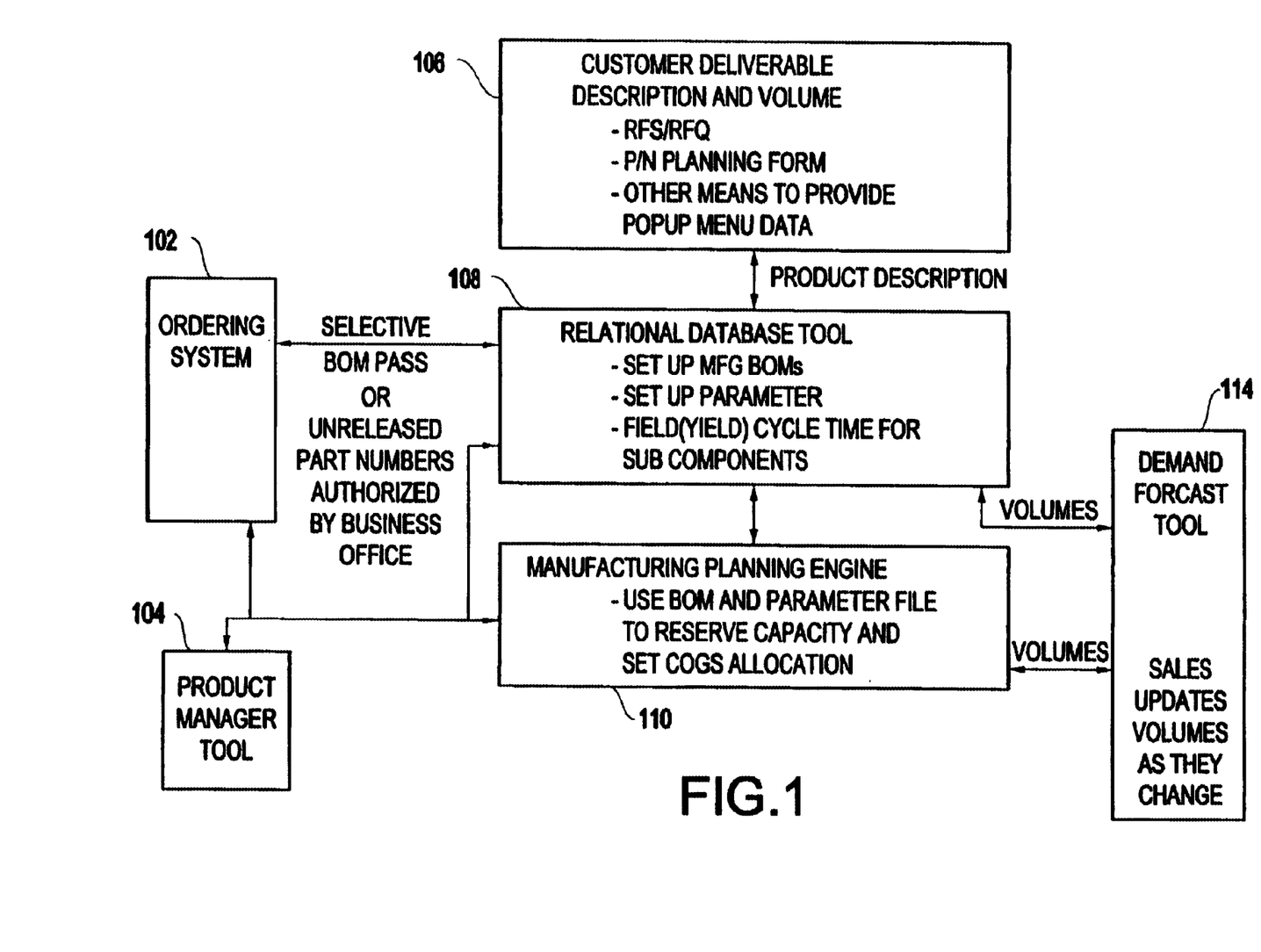
FIG. 1 is a diagram illustrating one embodiment of the invention.

More specifically, FIG. 1 illustrates a first embodiment of the invention. In FIG. 1, item 102 represents an ordering system. Item 102 is used by the sales department to accept an order for a customer deliverable from the customer. Item 102 provides input into the manufacturing planning engine 110 (directly or indirectly) to reserve manufacturing capacity. Item 102 also provides a commitment to customers on the quantity and delivery dates for the end customer deliverable. Thus, the invention reserves manufacturing capacity to satisfy a customer deliverable order for a product by inputting the customer deliverable order to the relational database tool 108 and obtaining a block of part numbers from unallocated part numbers in the product manager tool 104 to satisfy the customer deliverable order. Obtaining of the block of part numbers changes manufacturing capacity and thereby reserves manufacturing capacity for the customer's order. The invention automatically prepares a bill-of-materials in the relational database tool to satisfy the customer deliverable order using part numbers from the block of part numbers obtained from the product manager tool 104. By modifying manufacturing capacity, the invention can forecast the delivery date for the product. In addition, by immediately and automatically producing a bill-of-materials from a customer deliverable description, the invention can forecast the cost of the product. Only after the bill-of-materials has been produced does the invention actually begin designing the product. The bill-of-materials is revised as the designing process progresses.

Item 104 represents the portion of the product manager tool that reserves part numbers and stores records needed for manufacturing and planning after development is complete. Included in item 104 is a repository of the unique records needed to describe the end customer deliverable to manufacturing so that the part can be built. This repository contains bill-of material records for the end deliverable and each manufacturing subassembly needed to build the end deliverable. In many cases, multiple levels of deliverables will exist (example: for a semiconductor product, the system could contain a module bill-of-material, a package laminate, a die part number, a test program part number, a mask bill-of-materials for each part number needed, and numerous specifications needed for each level of assembly). The Product Manager system 104 often is automatically tied to line control systems used to load bill-of-material data to manufacturing line logistics systems.

Item 106 represents a customer deliverable description that can be a request for specification (RFS) or a request for quote (RFQ). The customer deliverable description can be created on a part number (P/N) planning form or can be input through any other means, such as a pop up menu for importing data. Item 106 also includes information as to the volume of products involved with the customer deliverable description. Item 106 outputs a product description to a relational database tool 108.

Item 108 generates and outputs manufacturing bill-of-materials. The bill-of-material contains a unique alphanumeric part number for the customer deliverable. A block of unique part numbers is obtained from the product manager tool 104 and is used to setup the bill-of-material for the end deliverable references, the hierarchy of manufacturing sub-components, and the manufacturing sourcing information needed to build the part. In the case of a semiconductor product the die, package/laminate, and specifications needed to build them are such sub-components. The die bill-of-material ties to the wafer bill-of-material and contains the mask bill-of-material for each mask level needed, and all associated wafer specifications.

The semiconductor industry uses a variety of different subcomponents and custom tooling to construct and manufacture a product including, packages, substrates, laminates, data interface boards, probes, cores, srams, and I/O. Development of the products that will use the subcomponent or custom tooling starts in parallel with the development of subcomponents and custom tooling. Groups doing development are often located in geographically different areas working on the specific subelement. Designers of the final product or the custom tooling often are forced to redesign because they are not aware of design changes in the subcomponents. Redesign is costly and significantly increases the time to market. This invention also provides a way for development items to be set up in menus with a unique identifier tagged to each item. All attributes of the subcomponent are tied to the part numbers so that the information becomes inherited by the product under development. Changes in the subcomponent can be communicated to the macro product development group (in the same company or different companies). The invention automatically notifies the changes to the team members using the subcomponent and can be provided each time the subcomponent is updated.

The specific demonstration that has been validated is for selection of semiconductor packages. The same process would work for any other subcomponent used in the semiconductor industry, as well as other industries that do development of subcomponents and product in parallel. The process would also work in industries where development of tooling to build a part is directly impacted by specific design of the part or its subcomponents. The number of packages used is more diverse than the number of silicon offerings and more complicated because the same package is called different things by different suppliers (two kinds of packages may use the same name).

The present invention provides a process for controlling the complete description of what a high technology sub assembly product will include (i.e, offerings, characteristics, limitations, bounds, etc.). The invention provides a means for development of a subcomponent or tooling needed to create a part that ties the attributes of each to the product that will use the subcomponent or will require the custom tooling. The invention provides a means through use of relational database to update product developments using the subcomponents or the custom tooling on development changes of attributes as they happen and have the new attributes inherited by the product that will be using them.

In one embodiment, this process is used to control semiconductor package offerings by establishing a relational database menu of packages with a standardized description of the key attributes of each package. The menu must contain all existing packages and all the planned packages that are available for consideration for sale.

Since the database is relational, the application engineering team working with customers or product development groups can easily choose the package best suited for their requirements. By accessing the menu item, this ensures that all involved have identified the same package. As the development of the package proceeds, the relationship between the package with its unique identifier is inherited by the product under development and the identified developers are notified of the changes. This menu process would work for any multi-variable item in addition to package selection or for any custom tooling needed to build a part. The relational database is used to tie parts of the package (or other items) description together. The central repository enables the business processes to effectively manage additions, deletions and changes. The menu can be imported to marketing/application engineering tools or other tools to provide drop down screens for selection. The unique identifier of the menu item allows the attributes to be associated with the products using the subcomponent or custom tooling. Any changes in the subcomponent can be inherited by the product using the subcomponent (or custom tooling). The developers of the product using the subcomponent can be automatically notified that a change in the subcomponent has happened. The changes in the subcomponent can be fed to a financial team for use in quotes with automatic notification. The changes in subcomponents or custom tooling can be fed to manufacturing lines to resize the needed capacity.

The semiconductor industry uses a variety of different packages for semiconductor products. The number of packages used is more diverse than the number of silicon offerings and more complicated, because the same package is called different things by different suppliers and two kinds of packages may use the same name.

The invention establishes a relational database menu of packages with a standardized description of the key attributes of each package. The menu must contain all existing packages and all planned packages that are available for consideration for sale. Since the database is relational, the application engineering team working with customers or product development groups can easily choose the package best suited for their requirements. By accessing the menu item, this ensure that all involved have identified the same package. This menu process would work for any multi-variable item in addition to package selection.

Another element of the invention is the relational database that is used to tie parts of package (or other item) description together. The central repository enables business processes to effectively manage additions, deletions, and changes. Finally, the menu can be imported to marketing/application engineering tools or other tools to provide drop down screens for selection.

The individual bill-of-materials are used by manufacturing locations around the world, to plan and order sub-components and integrate the sub-components into the end customer deliverable. Item 108 also sets up the parameters that are used by the manufacturing line to predict yield on the sub-component and the end customer deliverable to determine how much of each sub-component will be needed to yield the number of end customer deliverables ordered by the customer. Further, in item 108, the field (yield) cycle time for sub-components is established by referencing tables set up for families of each type of sub-component for the end customer deliverable. The tables are established by the manufacturing team providing that sub-component. After the parameters are applied to the length of time to build each sub-component, the cycle time for the end manufacturing deliverable can be calculated from the product description and parameters provided in the customer deliverable description.

The relational database tool 108 provides an override to allow the customer deliverable part number to pass to the ordering system 102 to provide the capability of accepting and acknowledging orders before the customer deliverable part has complete development and complete manufacturing level for bill-of-materials for the customer deliverable part number and all sub-components in the product manger tool 104. The relational database tool 108 outputs to the ordering system 102 and to the manufacturing planning engine. The ordering system 102 obtains a released part number from item 108 and automatically places an order with the manufacturing planning engine 110 if development is complete. If development is not complete and if an order is to be placed, the part number from the relational database 108 selectively passes from the relational database to the ordering system 102 (with the cycle time). The order flows (for parts with complete or incomplete development) from the ordering system 102 to the relational database 108 and identifies the bill-of-materials for all associated sub-components and the yield and cycle time for each sub-component. Bill-of-materials, yields and cycle times are sent to the manufacturing planing engine 110.

The manufacturing planning engine 110 uses the bill-of-material and yield and cycle time from the relational database tool 108 and the forecast demand from the marketing demand forecast tool (114) to reserve capacity for the customer deliverable's sub-components and the customer deliverable. The manufacturing engine 110 is able to provide a view of manufacturing loading including loading for items currently in development so that manufacturing resources can be optimized. As volumes desired by the customer change (114), the marketing and sales team can update the demand for products in development using the same process as for products fully developed and in manufacturing. The volume updates flow from the demand forecast tool 114 to the manufacturing planning engine 110 on the refresh cycle identified by each marketing/sales unit and automatically pass into the manufacturing planning engine 110. Capacity is allocated using the same supply/demand process for products in development as for products fully developed and in manufacturing.

An important feature of the invention is that, as the description of the customer deliverable changes during the development process, the bill-of-materials are automatically updated and new parameter files are generated by the relational database total 108 and the updated information is sent to the manufacturing planning engine 110 so that the manufacturing supply/demand system can be matched with the latest volume forecast sent from the demand forecast tool and capacity needs can be reevaluated and capacity reservation updated. The integration of the customer deliverable description to easily update the bill-of-materials construction and the yield/cycle time calculation input allows manufacturing to plan for products being developed, update capacity plans as development design point changes, and integrate with the same demand forecast tool used for parts currently in manufacturing. This allows the marketing/sales team to use the same tool and process for parts in development and parts in manufacturing.

Specifications are used by all parts of industry and governmental organizations to document how a procedure, practice, or manufacturing operation will be done. Most specifications are complex and require multiple approvals by many people before implementing. From the perspective of the user of a specification, it is desirable to have all elements in the specification. This results in large specifications that require review by many organizations. Financial consequences of an appropriate person or organization not being notified of an update or approval can be huge. Most specifications require updates and reissues that consume large amounts of resources to direct the specification to the correct organization and manage the updates. Today, the entire specification is sent to all parties for a complete review. Notification of updates often causes delays that result in building a back level product. This invention uses an object-oriented relational database to create specifications. The invention manages the distribution of the specification only to the people who need to review it and separates parts of the specification that need to be updated from parts that do not. Next, the invention uses a bridge to a product data manager to uniquely identify the updated specification from the back level specification (version control.). The new process/software results in faster specification updates, less resource needed to create and update specifications, and instant notification of updates.

The present invention provides a new way to create and manage changes to specifications in an object-oriented relational database. Elements of the specification are separated by categories organized by those needed to review the specification. A list of reviewers for each category is identified in the object-oriented relational database. The person initiating the review of the specification creates the update in the object-oriented relational database and locks the content (so the specification cannot be changed without reinitiating the process). The object-oriented relational database alerts the "category reviewers" that an update is out for review. If updates are needed, the specification can be reset through a rework look and review of the newly-updated specification is reinitiated. When all reviews are complete, the initiator of the review releases the specification through a bridge to a product management tool to obtain version control. The specification then passes back to the object-oriented relational database and is sent to all people identified on a notification list. Next, the database is sent directly to the manufacturing floor control systems (if bridges are set up). The version control can also be maintained in the object-oriented database by promoting the specification to "production level" which directly sends the notification list and any manufacturing floor control systems.

The invention also creates and updates the specification by providing a segmented specification in an object-oriented relational database with identified reviewers of each segment. The invention has a unique version control within the object-oriented relational database or through a link to a product data manager. The invention then locks the specification content in the object-oriented relational database and notifies the reviewers. The invention then collects approvals or non-approvals and provides a rework look if changes to the specification are identified during the rework process. The invention automatically notifies all the identified systems or people of updates.

High tech products are very often still in development when the manufacturing build of the prototype parts begins. In roughly 30% of module releases, the module documentation is still in development at the time the wafers are released into manufacturing lines. Commercial ordering systems like SAP and manufacturing control systems require that all part numbers be established before customers can place orders for part numbers. This results in very unhappy customers because they desire the security of having a commitment from their supplier (via a order being placed and accepted). Product management tools require that sub-components be released before customer deliverable part numbers can be released.

Businesses typically run financial plans in different systems than those used to support tactical execution in manufacturing systems. For high technology parts, this results in differences in execution that could be related to change in product description, change in volume demand, or change in manufacturing implementation. For complex high part number products, it is almost impossible to separate the cause of the problem; and accountability of the business management team is difficult to establish because they cannot easily be measured.

The present invention provides a relational database to stage up part numbers planned for release in a product management tool. The staged part numbers identify all the required manufacturing subelements including those used for stocking. The unreleased customer deliverable part numbers contain the manufacturing subelements needed for manufacturing systems to plan capacity, commit deliveries, and begin building of parts. This is a risk-based commitment that requires additional business rules, tables, etc. Thus, prior to final, complete development, parts or subelements can be released for building to ensure timely delivery of products. The system allows for dynamic updates given subelement yields, subelement development completion, etc.

The present invention provides a method to define high tech products at plan time. The invention forwards the information to the tactical manufacturer planning engine in order to establish a base plan. The invention provides a means within a relational database to track the changes and update the manufacturing resources as needed. This software/business process to bridge planning and tactical execution enables all manufacturing activities that occur at different times to be linked. This allows access to enable scenario-based planning, profit analysis, forecasting, line loading, capital planning, etc., using the same predictive models extending across all boundaries.

Figure 2:
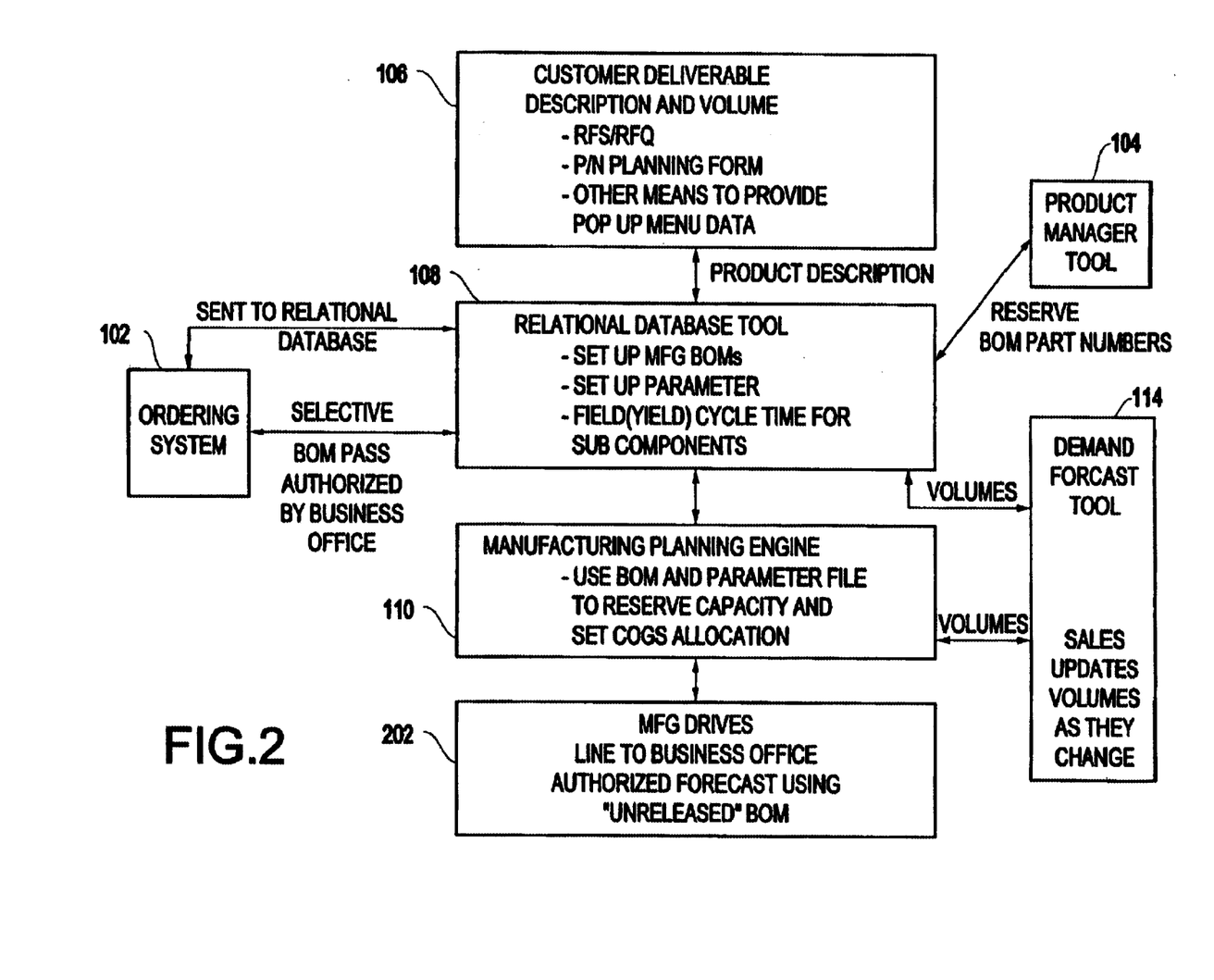
FIG. 2 is a diagram illustrating one embodiment of the invention.

FIG. 2 illustrates another embodiment of the invention. The embodiment in FIG. 2 is similar to that shown in FIG. 1 except that this embodiment includes a manufacturing driving tool 202, which represents the invention driving authorization for the build of manufacturing sub-components, which is needed for the customer deliverable in the case where development is complete for the sub-component, but the overall customer deliverable or another manufacturing sub-component for the end customer deliverable is still under development. Since some sub-components have very long manufacturing times, item 202 authorizing build of these sub-components as soon as development is complete reduces the overall cycle time to build the new end customer deliverable and eliminates program risk by providing time in the schedule to validate that the components can be successfully manufactured. This avoids the cost in manufacturing of expediting the sub-component build so that the build can be accomplished in less than the normal manufacturing cycle time. The system provides the capability to commit a delivery date and forecast quantity to a customer before the development is complete and without the full manufacturing planning system working (but without the additional expense of a completely decoupled system).

The relational database has a link to the product manager tool and reserves part numbers that will be later used for the customer deliverable and all manufacturing substock elements. The relational database derives the parameter file needed for manufacturing planning and passes the part number structure and parameter files (yield and cycle time) to the manufacturing tactical planning system. Links to the order system provide access to unreleased part numbers and allows order placement and order acknowledgment. Base information in the quote is used to derive manufacturing information accurately and quickly. Within the tactical planning engine, building a forecast can be authorized for subassemblies that are released.

In another embodiment, the use of the relational database simplifies questions asked to the business community with database questions must be answered. The relational database provides the means to populate product descriptions for initial planning and planning/product updates. Establishment on the fly of the needed manufacturing substock elements is required to enable planning. The substock elements are established based on simple questions in the input stream (is this a wafer, module, chip, etc.). The invention has the ability to track the changes made by the manufacturing system (table control) or business planning groups, (product description). The invention also integrates planning into the tactical execution engine (only one set of volumes need to be maintained). The invention has the ability to bridge planning to execution from a financial standpoint with the long range capability to set up a financial system that allocates the cost of goods used and plan time and measures performance to those requirements.

Figure 3:
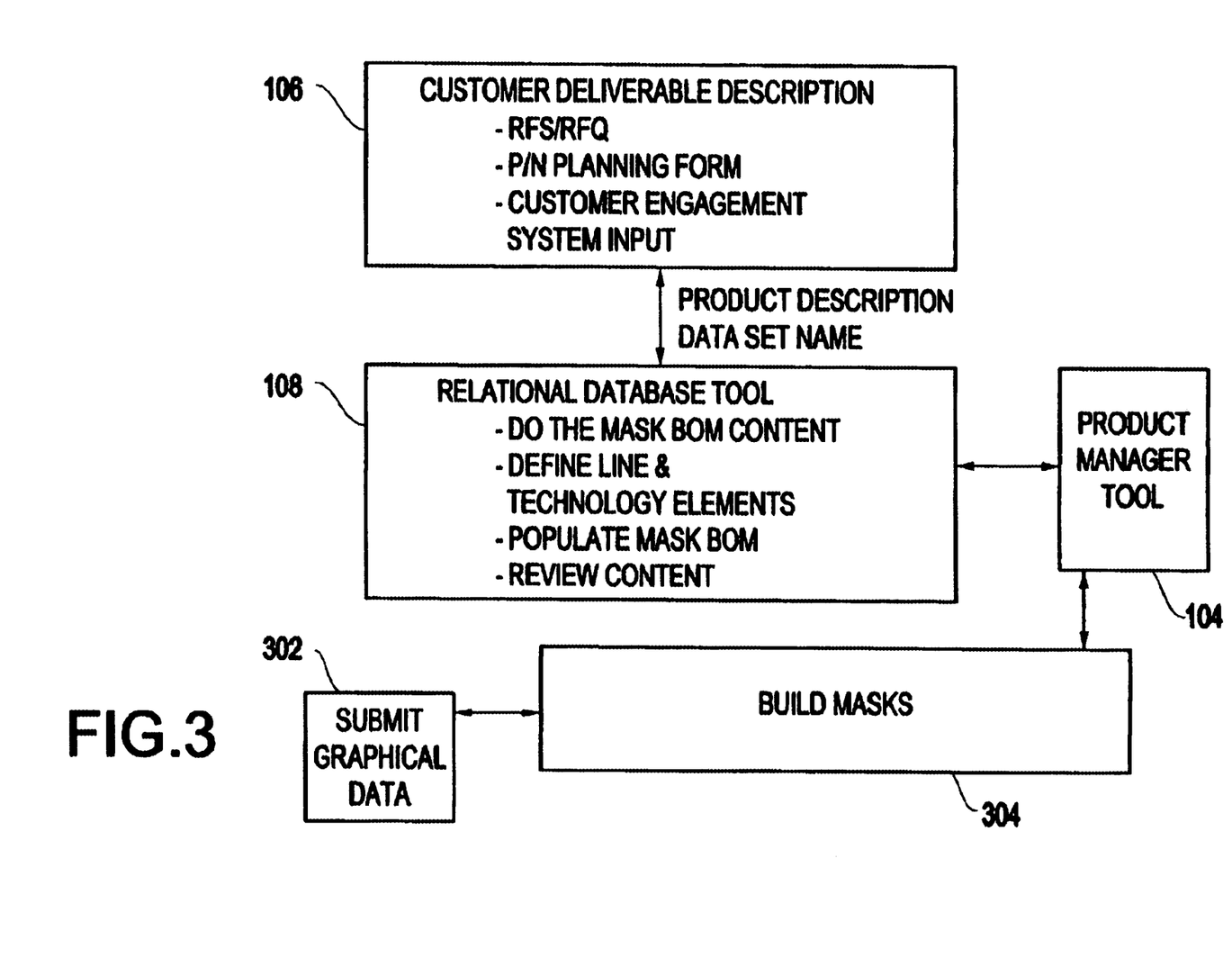
FIG. 3 is a diagram illustrating one embodiment of the invention.

FIG. 3 illustrates another embodiment that utilizes items 106 and 108, as discussed above. In this embodiment, the relational database tool 108 creates bill-of-materials for each mask used to create semiconductor products. The relational database 108 uses the information describing the customer deliverable and manufacturing line sourcing to identify the tools that will be used in individual manufacturing lines and the technology specifications that must be used to create the masks. Such detailed information includes but is not limited to type and location of pellicle, size of mask, thickness of mask, compensation needed in mask to accommodate wafer and mask manufacturing needs, structures needed by manufacturing to use the masks to make semiconductor products, and structures needed by manufacturing to control the manufacture of semiconductor products. This information is compiled into the individual bill-of-material for the individual mask needed to manufacture the product. The information in the bill-of-material is derived from the description of the product and identification of the wafer line manufacturing location. The relational database selects the preferred option automatically. Override capability is provided for testing new photo tool specifications. Thus, changing the sourcing or product description automatically updates the bill-of-materials for the masks. When the data set to be used to manufacture the end customer deliverable wafer sub-component is ready to be sent to the mask house for manufacturing, the staged bill-of-materials are locked in the relational database 108 and automatically sent to the product manager tool 104 where they are used to build the masks 304 using a submission of graphical data 302. The bill-of-materials are staged for the silicon wafer sub-component that will be built using the masks. The auto release to product manager tool 104 feature allows changes in the sourcing of the wafer build location, the mask build location, and the specifications and tool strategies for both to occur throughout the development process (without the need to redo the mask bill-of-materials each time). Without auto release and load, the mask bill-of-materials would need to be recreated each time the product or build strategies change. The use of the tables constructed in the relational database 108 also eliminates the person requesting the build to have in-depth knowledge of what the information in the bill-of-materials means and eliminates errors that result from manual entry of technical data with each order. The table structure contains relationships between tools and technologies and only allows combinations that are qualified to be ordered and built. The same process can be used to automatically create bill-of-materials for all sub-components needed to manufacture semiconductors (wafer, die, substrates, modules) or any other product.

Figure 4:
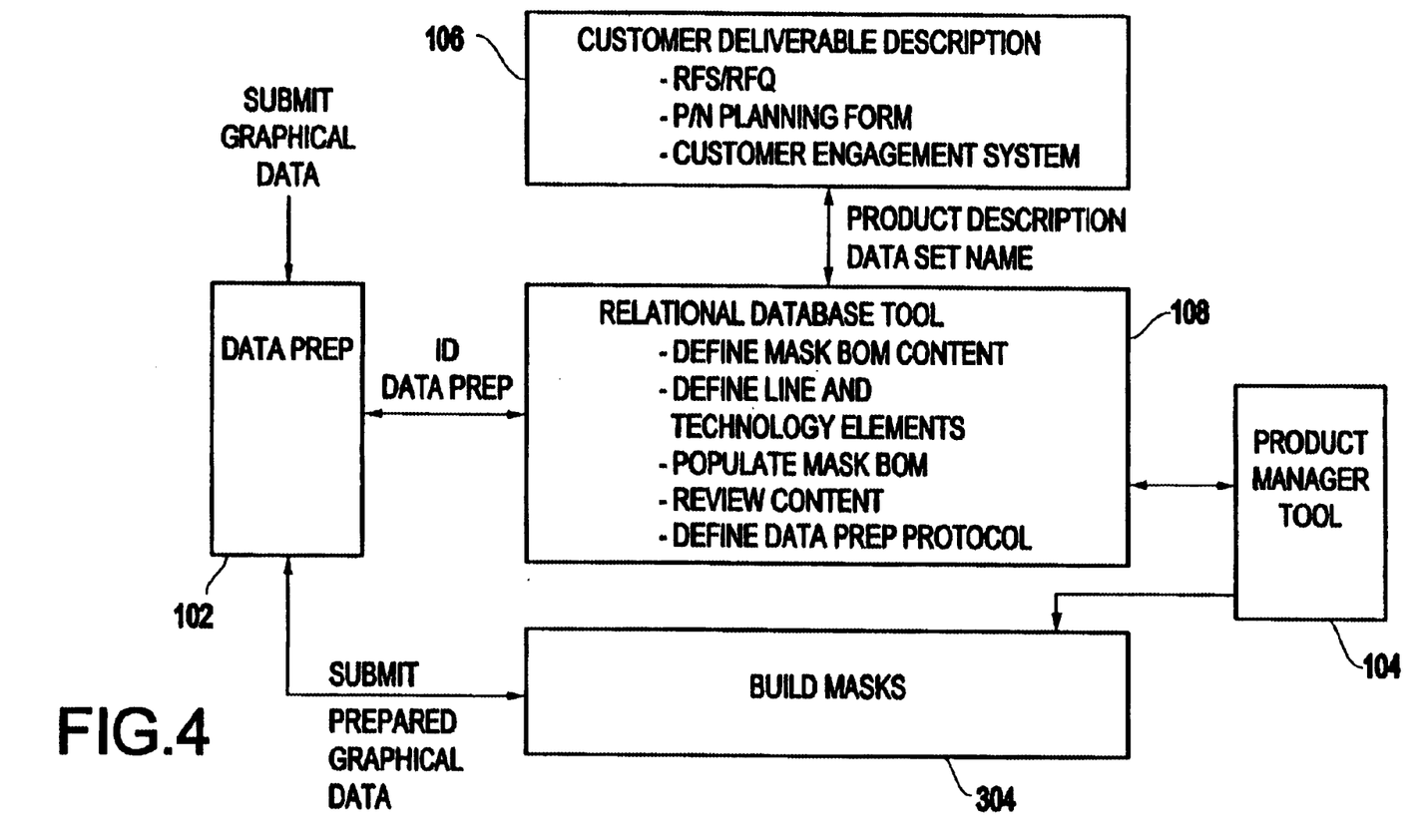
FIG. 4 is a diagram illustrating one embodiment of the invention.

FIG. 4 illustrates another embodiment that is similar to the embodiment shown in FIG. 3, discussed above. In FIG. 4, the relational database tool 108 outputs a data preparation identification to a data preparation engine 402. The data preparation engine 402 uses graphical data and the data preparation identification to prepare graphical data. The graphical data is then submitted to the build mask process shown in item 304. Graphical preparation engines (302, 402) require detailed information to apply compensations to masks and add extra shapes or holes to data sets to allow the graphical data to be manufactured in both the mask manufacturing process and in the semiconductor wafer manufacturing processes that use the masks.

The type of graphical preparation is dependent on the technology used to build the wafer and the type of tool that will be used to build the wafer and the type of tool that will be used to build the mask. Current processes require the product designer to answer very detailed questions on individual data set merges or exclusions, levels of data to be used and levels of masks to be built. Many errors resulting in missed customer delivery dates and zero yield product happen because of a wrong entry which can result in scrap. This embodiment uses the relational database 108 to set up allowed data prep protocols 402 that are tied to the description of the technology (part of the customer deliverable description) and the information already put in the mask-bill-of material for each mask. This interlocks the specific code used to prepare the data set used to build a mask to the information that is used to build the mask. Using only allowed combinations reduces the error rate to near zero. The time required to submit to data prep is also reduced. The person submitting the graphical data to build masks answer questions on what wafer sub-component the data prep is for, and the relational database (108) automatically makes the link to the correct data prep protocol (402).

Figure 5:
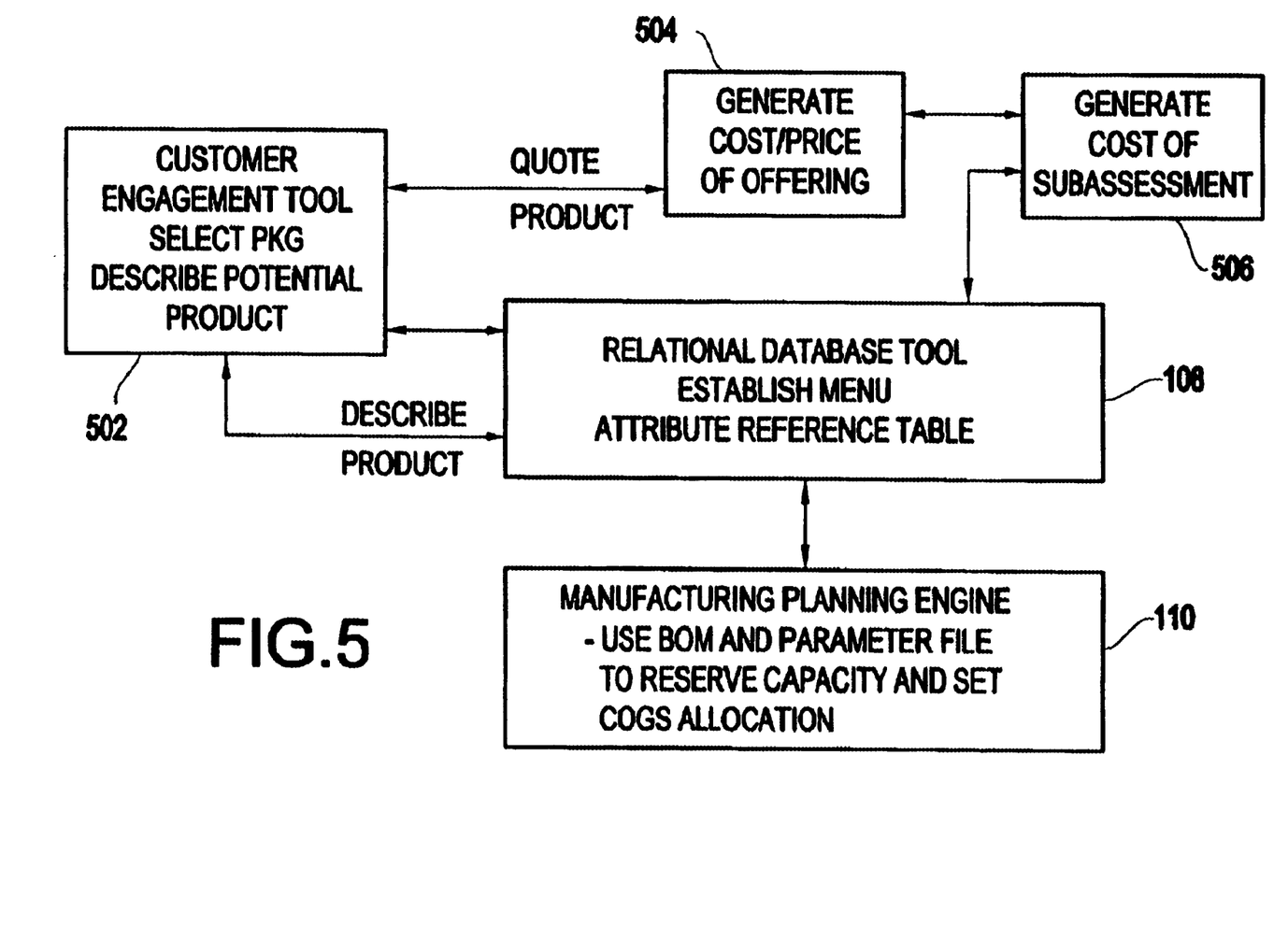
FIG. 5 is a diagram illustrating one embodiment of the invention.

Thus, the relational database tool 108 receives the customer deliverable order 106, the product manager tool 104 obtains a block of mask part numbers from unallocated mask part numbers to satisfy the customer deliverable order, and the data preparation tool 402 automatically provides prepared graphical data for the mask to the relational database tool. The relational database tool 108 automatically prepares the bill-of-materials to satisfy the customer deliverable order 106 using the prepared graphical data and part numbers from the block of part numbers. The prepared graphical data includes the type and location of pellicle, size of the mask, thickness of the mask, compensation needed in the mask to accommodate wafer and mask manufacturing needs, structures needed to use the mask to make the product, structures needed to control manufacturing of the product, etc. The relational database tool 108 identifies data preparation protocols to permit the data preparation tool to produce the prepared graphical data. Each sub-component of the mask has an associated data preparation protocol. The relational database 108 identifies the data preparation protocols automatically based on the customer order deliverable. The product manager tool obtaining the block of part numbers changes the mask manufacturing capacity and the customer engagement tool 502 (shown below) forecasts a cost of, and delivery date for the mask based on the bill-of-materials and the mask manufacturing capacity.

FIG. 5 illustrates yet another embodiment of the invention. In FIG. 5, the relational database tool 108 identifies the cost of each sub-assembly by looking at tables that contain the manufacturing yields, forecast cycle times, and number and type of sub-component needed to create the customer deliverable that is just starting in development (502). These costs are passed to a cost/price generation tool which is shown as item 506. Item 506 contains the rules for profit and loss for individual components and from the costs provided by the relational database tool 108 calculates the price to be used to quote to the customer 504. The price is then passed from the cost/price generation tool 504 back to the customer engagement tool 502 so that it can be put into a quote and given to the customer. As the content of the end customer deliverable in the customer engagement tool 502 changes throughout the development cycle, the process is repeated and new prices are generated (504) as the content of the end customer deliverable in development change and sent back to the customer engagement tool 502. This keeps the end customer deliverable description tied to price changes throughout the development cycle. The process outlined in FIG. 1 continues throughout this process and the manufacturing planning engine 110 is updated with the latest information to reserve manufacturing capacity in concert with cost/price updates. This establishes and maintains linkage between product description, forecast costs, prices given to customer, and capacity planned in manufacturing throughout the development cycle for a particular product and improves financial profit outlook by ensuring that the full manufacturing consequences of development change before they are committed to a customer.

After a supplier uses a product manager to establish the bill-of-materials (BOMS) for a part, set up of manufacturing systems is needed. This set up is manual and can be very error prone. Since the set up of manufacturing systems requires the part to be released in the product manager tool, it often delays the start of manufacturing. Deletion of records that are no longer needed is currently a manual process in most of the semiconductor industry. Since manufacturing is global, many records remain in storage, incurring unneeded data storage costs.

The present invention provides a centralized, up-dateable manufacturing logistics process that uses a software bridge to selectively unite and communicate the bill-of-materials and manufacturing routing information to the appropriate manufacturing systems. Using a relational database, the bill-of-materials structure for a part to be manufactured is set up completely and locked before it is released in the product. The logistics team adds the routing information in the relational database tool. The product is released in the product manager tool and flows back to the relational database manager tool. When the routing information passes through a bridge to each manufacturing system, the logistics system needs the bill-of-materials and routing information. If a bill-of-materials is obsolete, initiating the obsolete process in either the database manager tool or the product manager tool completes the obsolete process in both and deletes the no longer needed records in the worldwide manufacturing avoiding unnecessary data storage costs.

The invention establishes the unreleased bill-of-materials structure in the relational database tool. The invention also adds routing information in the relational database tool. The invention uses the relational database tools to selectively move the bill-of-materials and routing information to the individual manufacturing logistics systems that need them and only to the manufacturing systems that need them through a software bridge. The invention also uses the relational database tool or the product manager tool to delete records for manufacturing systems that no longer need them.

Figure 6:
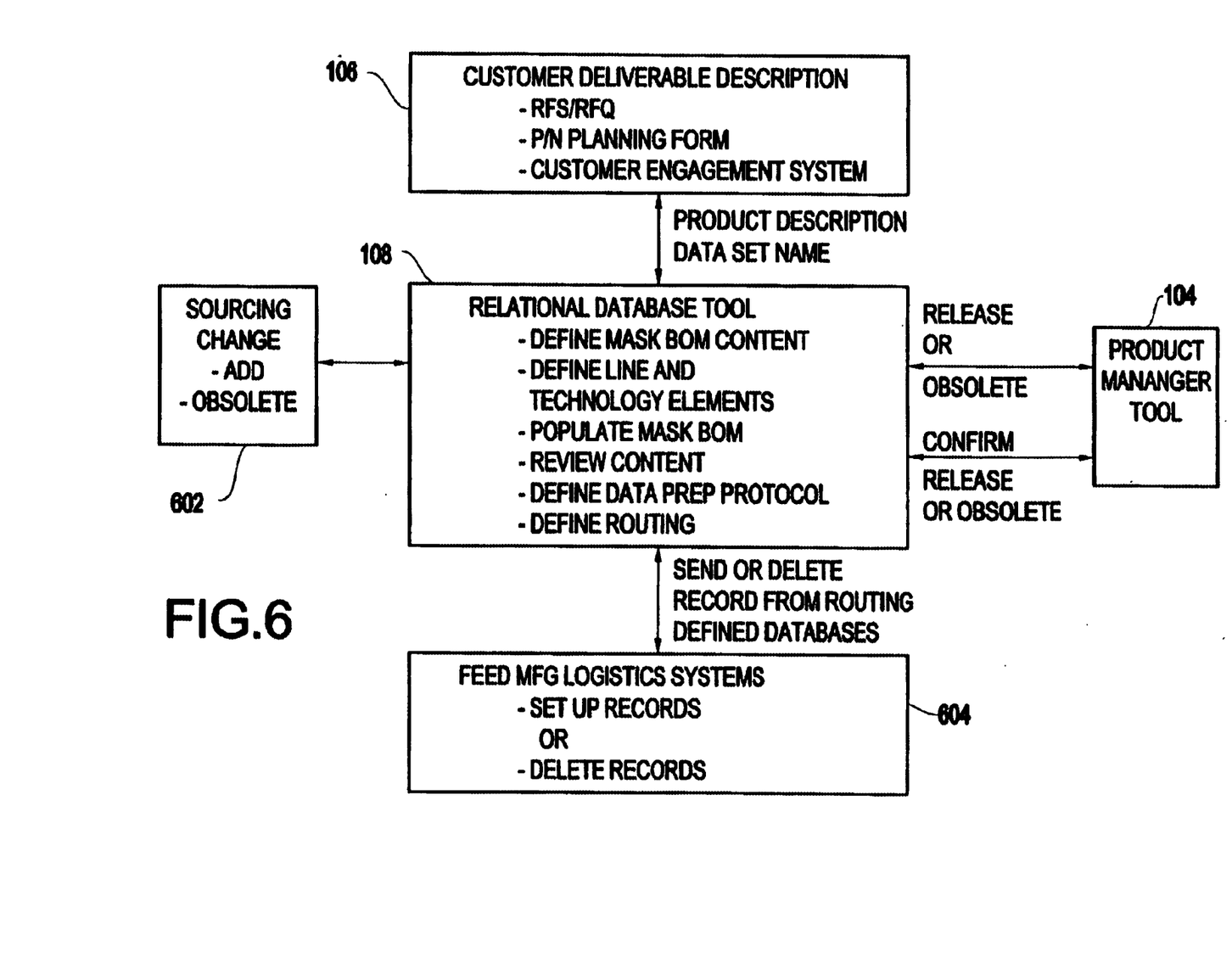
FIG. 6 is a diagram illustrating one embodiment of the invention.

FIG. 6 illustrates yet another embodiment of the invention. In this embodiment, the release of bill-of-materials in the product manager tool 104 is based in the sourcing change (add or obsolete) function in the relational database tool 108. In this embodiment, the decision to source a sub-component is made by selecting the sourcing change add/obsolete template 602 for the end customer deliverable. If adding a new source is selected, the relational database 108 will set up a new bill-of-material for the selected sub-component by referencing the description of the original end customer deliverable and referencing tables for the information for the new manufacturing source. The new bill(s)-of-material are created in the relational database tool 108 and sent to the product manager tool 104. Released (locked bill-of-materials) are sent back to the relational database 108 and to each of the worldwide manufacturing logistics systems 604. Item 604 triggers updating the systems to add the new bill-of-materials. Thus, item 604 automatically sets up each manufacturing line (no matter where it is located) with the record needed to manufacture the product. If a source, sub-component, or end customer deliverable is no longer allowed to be manufactured (made obsolete) in a particular location or in any location, the relational database 108 ties all bill-of-materials needed to manufacture the sub-component or all sub-components and the end customer deliverable, obsoletes or deletes the record in the product manager tool 104, and triggers each manufacturing location to delete the record from their manufacturing logistics control systems.

This interlock of authorization of sourcing change (604), adds an obsolete process to the product manager tool and the manufacturing logistics systems and eliminates manual entries. This embodiment ensures that records no longer needed are eliminated from manufacturing systems so that the manufacturing line knows that this sub-component is no longer planned to be manufactured in that line. Further, the records in the manufacturing logistics systems (which in some cases requires extensive data storage space) are limited to storage cost for products actually planned for manufacture in that location. The relational database makes changes to sourcing very fast and controlled, and eliminates multiple data entry in multiple systems (which avoids the high error rate associated with such practices).

Figure 7:
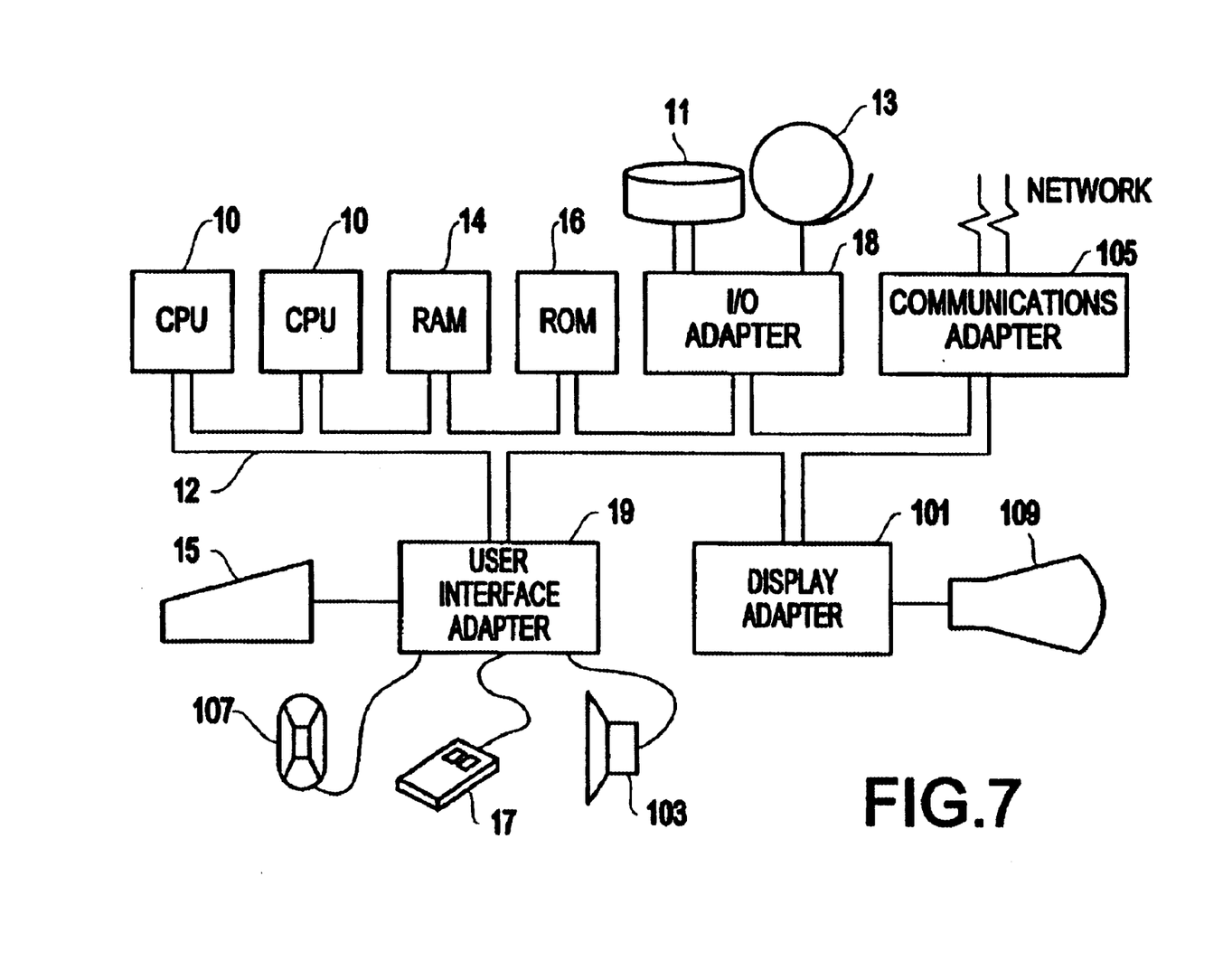
FIG. 7 is a hardware embodiment of the present invention.

A representative hardware environment for practicing the present invention is depicted in FIG. 7, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 107, and/or other user interface devices such as touch screen device (not shown) to bus 12, communication adapter 105 for connecting the information handling system to a data processing network, and display adapter 101 for connecting bus 12 to display device 109. A program storage device readable by the disk or tape units, is used to load the instructions which operate the invention also loaded onto the computer system.

As shown above, the invention prepares a relational database of part numbers that describes all information that allows the planning and build of all manufacturing subassemblies needed to produce an end semiconductor (or any product) and provides interlock with design protocols to automatically define the development and manufacturing processes needed to create this product. The overall system provides the capability to plan capacity for manufacturing sub-components before the components are developed, early ordering for sub-components that exist, interlock of manufacturing and development processes, and a seamless process where the description of the undeveloped product can be altered and the impact on the released and unreleased sub-components can be seen instantly. When a decision is made to proceed to manufacturing, the data in the conceptual bill-of-material can be frozen and moved automatically to the system used to store manufacturing records and to the customer.

What is claimed is:

1. A system for reserving manufacturing capacity to satisfy a customer deliverable order for a product, said system comprising:

a relational database tool adapted to receive said customer deliverable order;

a product manager tool operatively connected to said relational database tool, said product manager tool being adapted to obtain a block of part numbers from unallocated part numbers so as to allocate manufacturing capacity for said customer deliverable order, and to supply said block of part number to said relation database, wherein said relational data tool is further adapted to automatically prepare a bill-of-materials to satisfy said customer deliverable order using part numbers front said block of part numbers; and a manufacturing tool operatively connected to said manufacturing planning engine, said manufacturing tool being adapted to begin manufacturing of sub-components corresponding to said bill-of-materials before design of said product is completed.

2. The system in claim 1, wherein said product manager tool changes manufacturing capacity based upon the part numbers obtained in said block of part number.

3. The system in claim 2, further comprising a customer engagement tool operatively connected to said relational database tool, said customer engagement tool being adapted to forecast a cost of, and delivery date for said product based on said bill-of-materials and said manufacturing capacity.

4. The system in claim 1, further comprising a manufacturing planning engine operatively connected to said relational database, wherein said manufacturing planning engine is adapted to design said product based on said bill-of-materials, wherein said relational database is further adapted to revise said bill-of-materials as designing of said product progresses.

5. The system in claim 1, wherein said bill-of-materials includes at least one of: tools needed to manufacture said part; detailed measurements of said part; and structures needed in said part.

6. The system in claim 1, further comprising an add/obsolete tool operatively connected to said relational database tool, said add/obsolete tool being adapted to automatically delete unneeded part numbers from said relational database tool.

7. A method of reserving manufacturing capacity to satisfy a customer deliverable order for a product using a computerized system, said method comprising:

inputting said customer deliverable order to a relational database tool within said computerized system;

automatically obtaining a block of part numbers from unallocated part numbers in a product manager tool that is operatively connected to said relational database tool, so as to allocate manufacturing capacity for said customer deliverable order;

automatically preparing a bill-of-materials in said relational database tool to satisfy said customer deliverable order using part numbers from said block of part numbers; and beginning manufacturing of sub-components corresponding to said bill-of-materials before design of said product is completed.

8. The method in claim 7, wherein said obtaining of said block of part numbers changes said manufacturing capacity based upon part numbers obtained.

9. The method in claim 8, further comprising forecasting a cost of, and delivery date for said product based on said bill-of-materials and said manufacturing capacity.

10. The method in claim 7, further comprising, after said producing of said bill-of-materials:

designing said product; and revising said bill-of-materials as said designing of said product progresses.

11. The method in claim 7, wherein said preparing of said bill-of-material includes identifying at least one of: tools needed to manufacture said part; detailed measurements of said part; and structures needed in said part, based on said information within said relational database tool.

12. The method in claim 7, further comprising automatically deleting unneeded part numbers from said relational database tool.

13. A program storage device readable by machine, tangibly embodying a program of instructions readable by said machine for performing a method of reserving manufacturing capacity to satisfy a customer deliverable order for a product, said method comprising:

inputting said customer deliverable order to a relational database tool; obtaining a block of part numbers from unallocated part numbers in a product manager tool so as to allocate manufacturing capacity said customer deliverable order; and automatically preparing a bill-of-materials in said relational database tool to satisfy said customer deliverable order using part numbers from said block of part numbers; and beginning manufacturing of subcomponents corresponding to said bill-of-material before design of said product is completed.

14. The program device in claim 13, wherein said obtaining of said block of part numbers changes said manufacturing capacity based upon the part numbers obtained.

15. The program storage device in claim 14, wherein said method further comprises forecasting a cost of, and delivery date for said product based on said bill-of-materials and said manufacturing capacity.

16. The program storage device in claim 13, wherein said method further comprises, after said producing of said bill-of-materials:

designing said product; and revising said bill-of-materials as said designing of said product progresses.

17. The program storage device in claim 13, wherein said method further comprises automatically deleting unneeded part numbers from said relational database tool.

* * * * *